Figure 1:
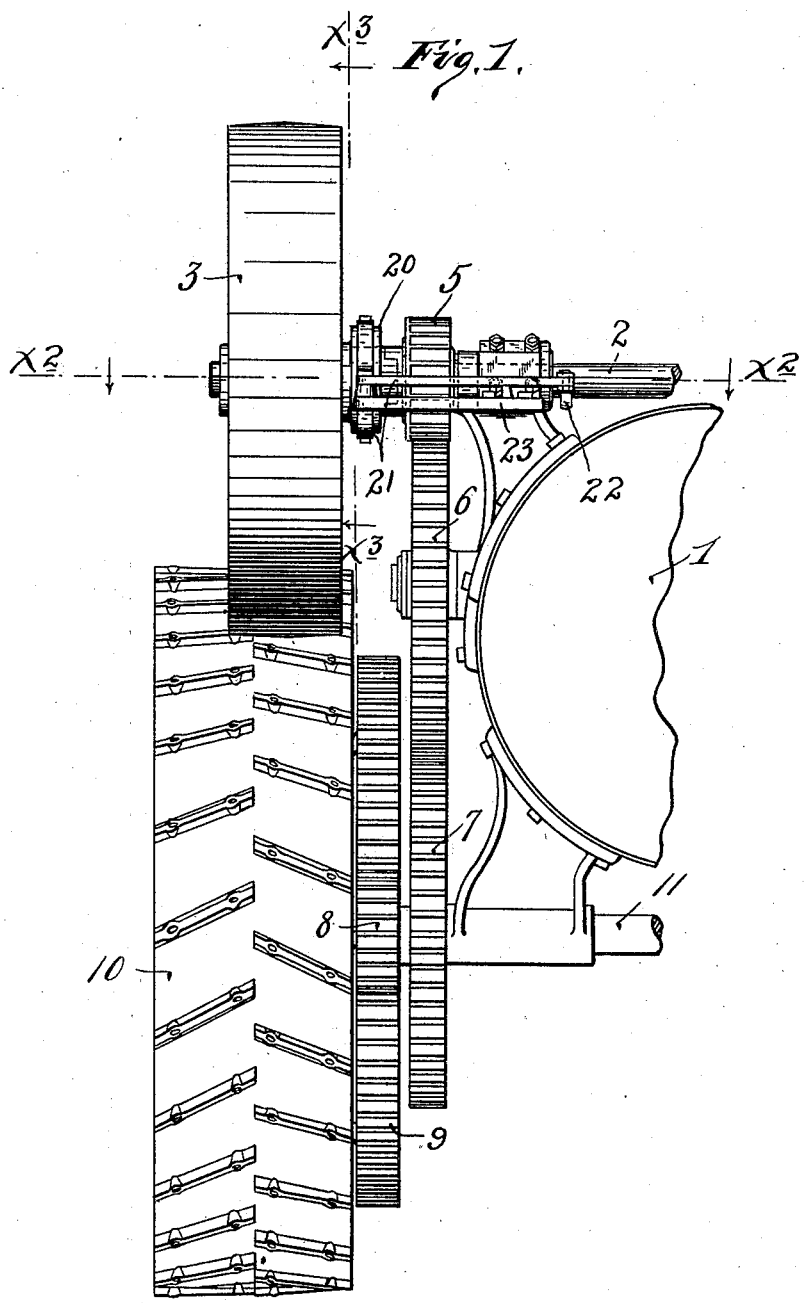

No. 690,536. Patented Jan. 7, 1902.
P. SWENSON.
FRICTION CLUTCH FOR TRACTION ENGINES.
(Application filed June 21, 1901.)

(No Model.) 3 Sheets—Sheet 3.

Witnesses.
Harry Kilgore.
Robert Otto.

Inventor:
Paul Swenson,
By his Attorneys,
Williams & Merchant

UNITED STATES PATENT OFFICE.

PAUL SWENSON, OF MINNEAPOLIS, MINNESOTA.

FRICTION-CLUTCH FOR TRACTION-ENGINES.

SPECIFICATION forming part of Letters Patent No. 690,536, dated January 7, 1902.

Application filed June 21, 1901. Serial No. 65,437. (No model.)

*To all whom it may concern:*

Be it known that I, PAUL SWENSON, a citizen of the United States, residing at Minneapolis, in the county of Hennepin and State of Minnesota, have invented certain new and useful Improvements in Friction-Clutches for Traction-Engines, &c.; and I do hereby declare the following to be a full, clear, and exact description of the invention, such as will enable others skilled in the art to which it appertains to make and use the same.

My invention relates to friction-clutches of the expansion type, and has for its object to provide an improved clutch of this class with a view of securing increased efficiency.

To this end my invention consists of the novel devices and combinations of devices which will be hereinafter described and defined in the claims.

My improved clutch is especially designed for use on traction-engines of the class now generally employed for operating threshing-machines and many other purposes; and the clutch is illustrated in the drawings as applied to traction-engines.

Figure 2:
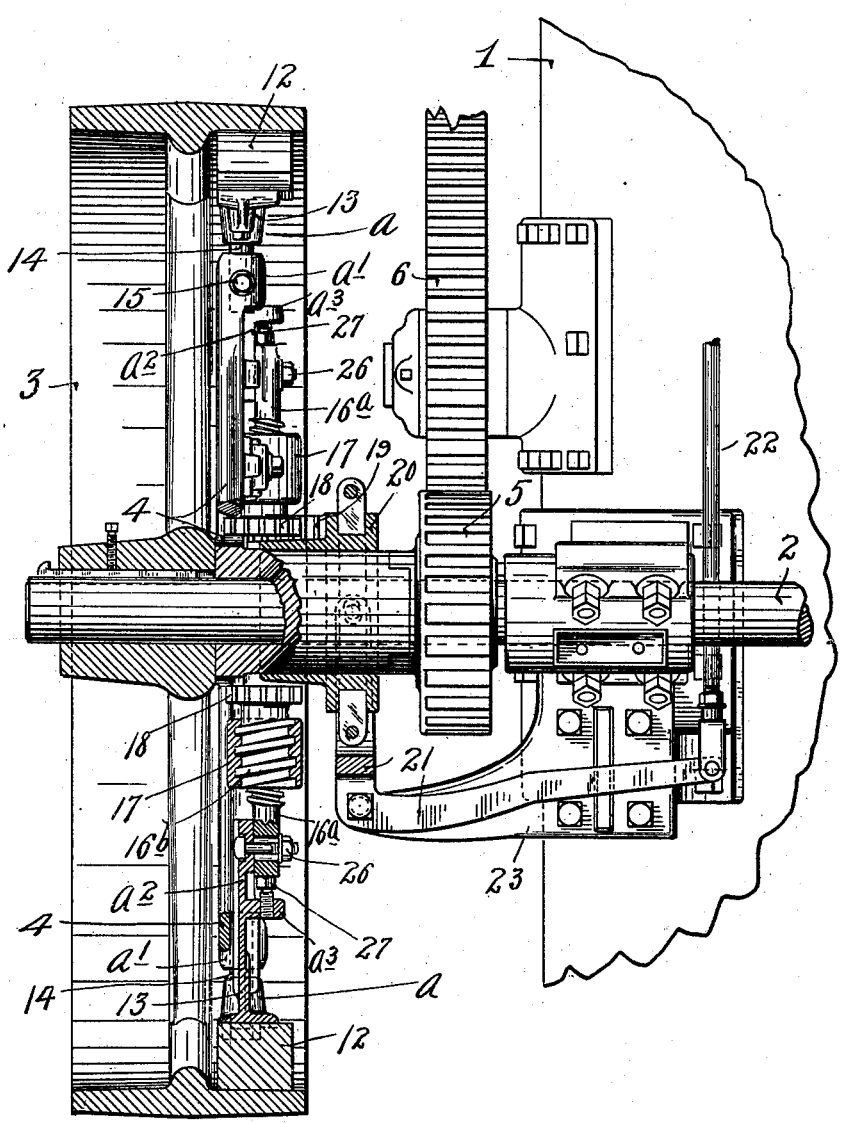
Figure 3:
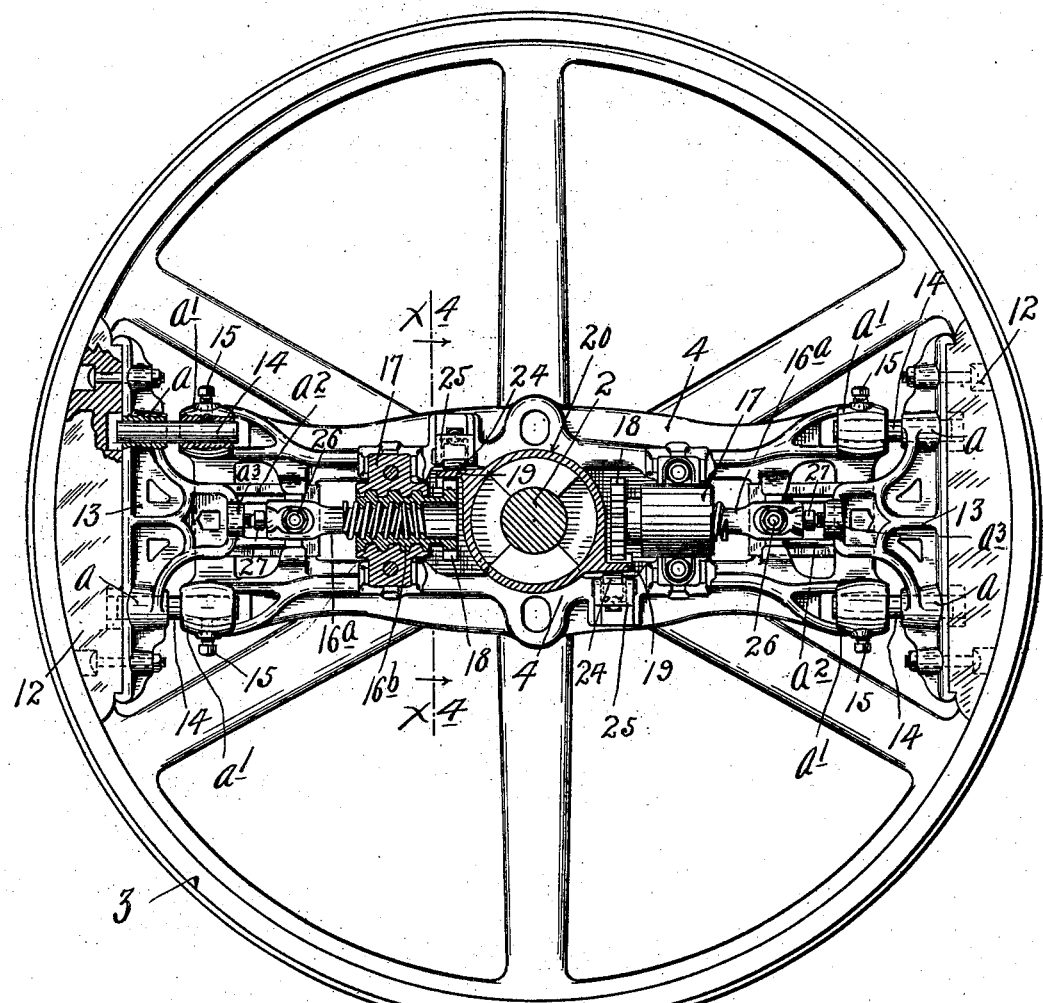
Figure 4:
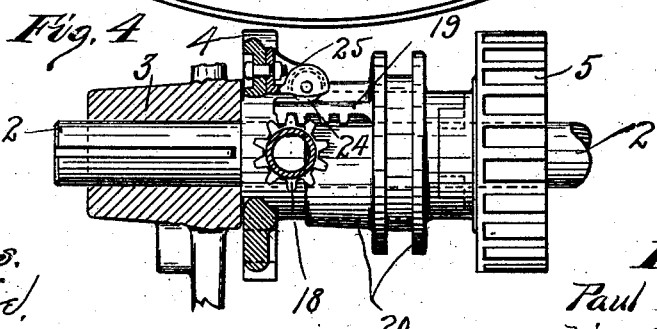

In the said drawings, Figure 1 is a view chiefly in front elevation, with some parts removed and others broken away, showing the friction-clutch in working position on a traction-engine. Fig. 2 is a view in horizontal section on the line $x^2$ $x^2$ of Fig. 1 with some parts shown in plan and others broken away. Fig 3 is a view chiefly on the line $x^3$ $x^3$ of Fig. 1 with some of the parts of the clutch shown in elevation and others shown in radial section and with some portions broken away. Fig. 4 is a detail chiefly in vertical section on the line $x^4$ $x^4$ of Fig. 3, but with the hub of the fly-wheel shown in axial section.

The crank-shaft 2 of the engine is mounted in suitable bearings secured to the shell 1 of the boiler in the customary way and is provided with the usual fly-wheel pulley 3, keyed or otherwise made fast to the shaft. Alongside the fly-wheel pulley 3 is loosely mounted on the engine-shaft 2 a spider 4 of proper form to support the other coöperating parts of the friction-clutch. The spider 4 has an extended hub notched at its inner end and constantly engaging with a corresponding reversely-notched hub of the loose initial member 5 of the train of gears 5, 6, 7, and 8, constituting the traction-train for imparting motion to the traction-wheels 10. The members of this traction-train are mounted and related in the customary way, the member 6 being supported on a suitable bearing projecting from the boiler-shell and the members 7 and 8 being secured to a counter-shaft 11, supported in suitable bearings projecting from the boiler-shell, and the members 9 being an integral part of the traction-wheels 10.

The friction-shoes 12 are carried by holders 13, suitably mounted for radial movement on the arms of the spider 4. As shown, the shoes 3 have socket portions $a$, which work on dowel or guide studs 14, removably secured by set-screws 15 or otherwise in socket-lugs $a'$, formed integral with the outer ends of the spider-arms. The shoe-holders 13 are also provided with radial arms or portions $a^2$, extending radially inward and working in suitable guide-passages provided for the same in the arms of the spider. The friction-shoes are thus carried by the spider with freedom for radial motion thereon. For imparting the radial motion to the shoe-holders 13 I provide novel devices in the nature of screw-action spreaders. The screw-action spreaders include sectional rods $16^a$ and $16^b$, having screw-threaded engagement with each other, the outer member of which rod-sections—to wit, $16^a$—is mounted for action on the shoe-holders 13 and the inner members of which rod-sections $16^b$ work as loose nuts within fixed nuts 17, fixed to the spider-arms. The rod-section $16^a$ has an external screw-thread, and the rod-section $16^b$ is hollow and is provided both with internal and external threads. The internal thread of the rod-section $16^b$ engages with the external thread of the rod-section $16^a$, and the external thread of the rod-section $16^b$ or loose nut engages with the thread of the fixed nut 17. At their inner ends the spreader-rod sections $16^b$ are provided with pinions 18, which engage with the racks 19, formed integral with a shipper-collar 20, loosely mounted, with freedom for sliding motion, on the extended hub of the spider 4. The shipper-collar 20 is subject to the short end of a bell-crank shipper-lever 21, pivoted to the bearing-bracket 23 for the crank-shaft 2. To the long arm of the bell-crank shipper-lever 21 is attached an operating-rod 22, extending to a point within convenient reach of the engineer when in his usual position at the fire-box end of the engine. The racks 19 are shown as bearing against antifriction-rollers 24, carried by bearing-brackets 25, shown as removably secured to the spider 4 in proper positions for the rollers 24 to act against the back surfaces of the racks 19. The racks 19 are located, preferably, one hundred and eighty degrees apart and engage from opposite sides on the respective pinions 18 of the spreader-rod sections 16$^b$, operated thereby. Hence a shifting movement of the shipper-collar 20 lengthwise of the spider-hub or engine-shaft will rotate the spreader-screws in reverse directions, and thereby cause the latter to force the friction-shoes outward or inward together, according to which way the shipper-collar may be moved. As shown in the drawings, the shipper-collar 20 moves outward or toward the fly-wheel pulley 3 to spread the shoes and force the same into engagement with the overhanging flange of the fly-wheel pulley and moves in the opposite direction to effect the release.

To afford means for readily taking up the wear and tear on the friction-shoes 12, the outer sections 16$^a$ of the spreader-rods are not rigidly made fast to the shoe-holders 13, but are slotted at their outer ends and are clamped to said holders by nutted bolts and washers, with the bolts 26 working through the slots in the ends of the rods. The outer ends of the rod-sections 16$^a$ bear against the heads of adjusting screw-bolts 27, which work in projecting or face lugs $a^3$ on the arms $a^2$ of the shoe-holders 13. Hence in the outward or spreading movement of the rods on the shoes a positive action is insured; but the throw can be varied by manipulating the adjusting-nuts 27, thereby affording means to compensate for the wear and tear on the shoes. For the inward or releasing action the strain of course is comparatively light, and hence the connection afforded by the clamping-bolts 26 is sufficient for that purpose.

The pitches of the screw-threads on the spreader-rod members 16$^a$ and 16$^b$ and on the fixed nuts 17 are preferably such as to afford a cumulative action of the rod-sections in respect to the fixed nuts 17. Otherwise stated, for any given rotary movement of the pinions 18 a radial or longitudinal movement will be imparted to the outer sections 16$^a$ of the spreader-rods equal to the sum of the pitch-lines of the threads of the fixed and the loose nut—i. e., the elements 17 and 16$^b$. Hence a small shifting movement of the shipper-collar 20 and the racks 19 carried thereby will impart a comparatively large radial movement to the friction-shoes. This affords a quick-action clutch and a sensitive clutch.

The leverage afforded by the double screws in combination with the pinions, racks, and bell-crank shipper-lever enables the shoes to be set in their clutching position under requisite friction for any required work without any large amount of power being required for the purpose from the engineer or other person manipulating the rod 22. Otherwise stated, the clutch is easy to set in clutching position.

Another important advantage of this clutch, with my screw-action spreader, is the fact that the screw devices will of themselves hold the shoes in their set or clutching position. No special lock is required for the purpose.

It is a matter of indifference whether the hand-lever (not shown) applied to the manipulating-rod 22 have a lock-segment or not. The screws and the racks and the pinions will hold the shoes in whatever position they may be set. The shipper-collar or screw-actuating device might take other forms and be otherwise mounted as long as it is capable of imparting the necessary motion to the spreading-rods. The shoe-holders might of course be otherwise mounted as long as they are subject to the action of the spreading-screws.

The double form of the screws is very desirable, and I would not consider a single screw as the full mechanical equivalent of the double screw, for the reason that the double screw affords advantages not securable with the single screw.

The clutch hereinbefore fully described is especially well adapted for use on traction-engines of the kind now generally employed to operate threshing-machines. When threshing, the traction-train of course stands idle, and motion is communicated from the fly-wheel pulley 3 through a suitable belt to the threshing-cylinder. In setting the engine in respect to the threshing-machine it is necessary to "back up in the belt." For that purpose the clutch must be thrown into its closed position, so as to bring the traction-train into action; but the pull on the belt must be a yielding one, or the belt will break. Hence the clutch must be sensitive in its action to meet these requirements. This clutch does the work, fully meeting these peculiar conditions, as demonstrated in actual usage. On the other hand, when using the engine on the road or on soft ground in the field as a traction-engine to propel not only its own weight, but to pull the separator, water-tender, &c., the clutch must be a very powerful one. Otherwise stated, the spreader must be capable of being set under powerful friction, sufficient to move the heaviest load under the greatest emergency pull. This clutch will do the work. It is both sensitive and strong.

While especially designed for use on traction-engines, as above stated, it will of course be understood that my improved clutch is capable of general application in the arts to all the uses for which expansion friction-clutches may be applied.

The construction may of course be changed in detail without departing from the spirit of the invention.

What I claim, and desire to secure by Letters Patent of the United States, is as follows:

1. In an expansible friction-clutch, the combination with a movable shoe-equipped holder and a relatively fixed resistance nut or block, of a sectional spreading-rod, the internal member of which is connected to said shoe-holder, and the external member of which has internal and external screw-threads engaging, respectively, said internal rod-section and said resistance nut or block, and an actuating device applied to impart a screw action to said spreading-rod, substantially as described.

2. In an expansible friction-clutch, the combination with a movable shoe-equipped holder and a relatively fixed resistance nut or block, of a sectional spreading-rod the internal member of which is connected to said shoe-holder and the external member of which has internal and external screw-threads engaging, respectively, said internal rod-section and said resistance nut or block, a pinion on said external rod-section, a rack engaging said pinion, and a shipper-collar connected to said rack, substantially as described.

3. The combination with the engine-shaft having a fly-wheel pulley fixed thereto, of a spider or head loose on said shaft and having secured to rotate therewith the loose or initial member of the traction-train of gears, shoe-equipped holders mounted for radial movements on said spider or head, resistance nuts or blocks fixed on said spider or head, sectional spreading-rods the internal members of which are connected to said shoe-holders and the external members of which have internal and external screw-threads engaging respectively, said internal rod-sections and said resistance-nuts, pinions on said external rod-sections, racks engaging said pinion, and a shipper-collar mounted on the external hub of said spider and connected to said racks, substantially as described.

In testimony whereof I affix my signature in presence of two witnesses.

PAUL SWENSON.

Witnesses:
F. E. KENASTON,
F. D. MERCHANT.